United States Patent [19]

Nuechterlein

[11] 4,150,424
[45] Apr. 17, 1979

[54] DYNAMIC CURRENT BALANCING FOR POWER CONVERTERS

[75] Inventor: Paul E. Nuechterlein, Worthington, Ohio

[73] Assignee: International Telephone and Telegraph Corporation, New York, N.Y.

[21] Appl. No.: 893,496

[22] Filed: Apr. 4, 1978

[51] Int. Cl.² .................... H02M 3/335; H02M 7/537
[52] U.S. Cl. ........................................ 363/26; 363/56; 363/134; 363/97
[58] Field of Search ....................... 363/24, 25, 26, 55, 363/56, 97, 133, 134

[56] References Cited
U.S. PATENT DOCUMENTS

| | | | |
|---|---|---|---|
| 3,670,234 | 6/1972 | Joyce | 363/134 X |
| 3,859,583 | 1/1975 | Reed | 363/26 |
| 3,859,586 | 1/1975 | Wadlington | 363/25 X |
| 3,869,566 | 3/1975 | Smith | 363/26 X |
| 3,873,903 | 3/1975 | Koetsch et al. | 363/25 |
| 4,002,963 | 1/1977 | Hunter | 363/41 X |

Primary Examiner—William M. Shoop
Assistant Examiner—Peter S. Wong
Attorney, Agent, or Firm—James B. Raden; Donald J. Lenkszus

[57] ABSTRACT

A current balance arrangement for the power switching devices of a push-pull converter circuit is disclosed. A dynamic dead band circuit is incorporated into a pulse width modulation current balance and output voltage regulation control circuit to prevent current imbalance from causing saturation of the power transformer core for all operating conditions of the converter including input voltage falling below its rated low-line value, sudden load surges, or turning off of the converter power supply. Whenever the dynamic dead band circuit determines that inverter current flow is being terminated by the dead band interval of the converter clock, a control signal is sent to the pulse width modulation circuitry of the converter to effect inverter current termination prior to initiation of the clock dead band interval in subsequent cycles of converter operation. The invention eliminates the need for providing inverter power switching devices having closely matched electrical characteristics.

7 Claims, 5 Drawing Figures

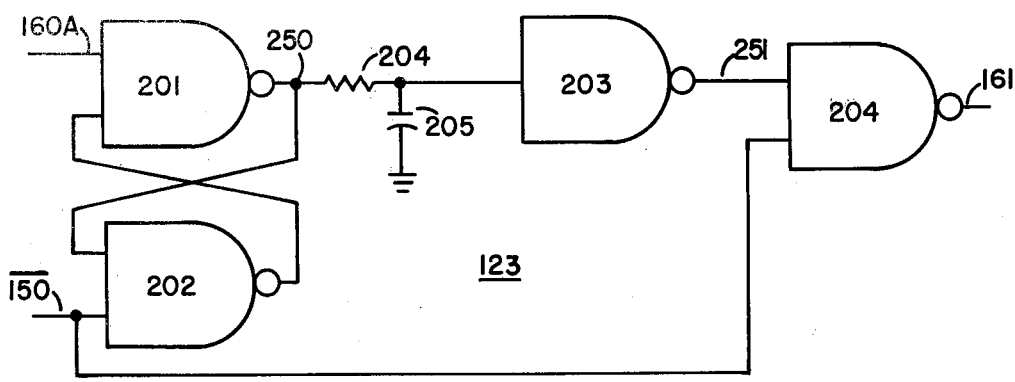
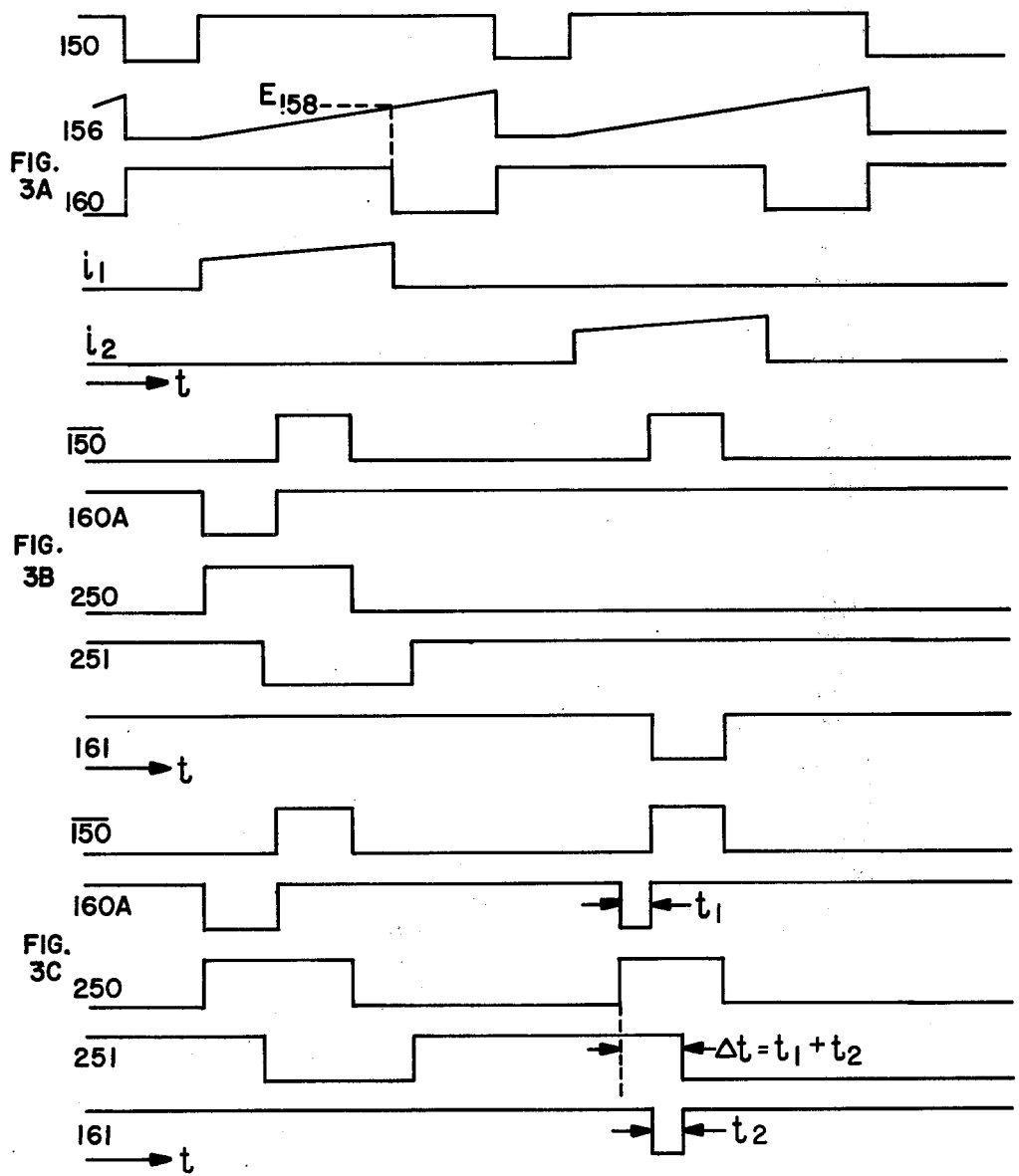

DYNAMIC CURRENT BALANCING FOR POWER CONVERTERS

BACKGROUND OF THE INVENTION

1. Field of the Invention

The invention concerns regulation control techniques for pulse-width-modulated, push-pull power converter circuits. More specifically, the invention pertains to arrangements for ensuring current balance between the power switching devices of the inverter stage of a converter circuit and for preventing DC saturation of the inverter transformer core under a variety of operating conditions.

2. Description of the Prior Art

The well-known push-pull type of inverter stage used in DC/DC power converters is attractive, because only one power switching device is conducting at any given instant of time, resulting in minimum saturation drop loss and increased efficiency. A disadvantage of the push-pull inverter approach is the tendency for inverter transformer core saturation caused by inverter components with dissimilar electrical operating characteristics. Inverter transformer core saturation, in turn, often results in converter power supply failure.

One prior approach to avoiding inverter transformer core saturation is to attempt to precisely match the electrical characteristics of the inverter power switching components. However, matching of the power components has the inherent disadvantages of increased component cost, difficulty of servicing existing units, and degradation of the critical match of component characteristics caused by temperature and aging.

The prior art teaches an electronic circuit alternative to device characteristic matching. One such prior art approach is set forth in U.S. Pat. No. 4,002,963—Hunter, issued Jan. 11, 1977. The inverter switching device dynamic current balance technique taught by Hunter involves monitoring the current level drawn by each inverter device, and, upon mismatch, altering the conduction time in each alternate half cycle of converter operations for that device drawing a current outside of the allowable reference norm.

While such a dynamic current balance approach improves push-pull converter performance and reliability, it is not effective for all converter operating conditions. The current balance function in circuits such as that taught in the above-referenced Hunter patent ceases to be effective when the conduction interval of the inverter power switching devices becomes long enough to approach overlapping conduction between the switching devices. Such overlap must be prevented, else the power switching devices will be destroyed. The conventional approach to preventing such overlap is the creation of a fixed time interval in each half cycle of converter operation wherein both inverter power switching devices are forced to the non-conducting state. This time interval is commonly referred to as the dead band interval.

Conditions such as converter input below rated low-line value, sudden increases in converter loading, or converter shutdown tend to prolong the required conduction interval of the inverter switching devices to the extent that the dead band interval must be relied on for device turn-off in each half cycle. However, under this condition, the converter's pulse width modulation control circuitry can no longer compensate for unbalanced inverter currents, resulting in the possibility of inverter transformer core saturation.

Hence, there is seen to be a need in the prior art for a means of providing push-pull converter dynamic current balance under all converter operating conditions.

SUMMARY OF THE INVENTION

It is therefore an object of this invention to maintain current balance in the power switching devices of a push-pull inverter even under operating conditions such as converter input voltage falling below its rated low-line value, sudden output load surges, or converter turn-off.

A dynamic dead band circuit is disclosed for ensuring inverter current balance in a push-pull power converter circuit. The dynamic dead band circuit monitors the timing of the switching control output of the converter's pulse width modulation control circuitry. Whenever the dynamic dead band circuit determines that inverter current is being terminated by the clock dead band signal rather than by the pulse width modulation circuitry, a control signal is generated and coupled back to the pulse width modulation circuitry, effective to alter a reference signal therein to force the pulse width modulation circuitry to terminate inverter current flow prior to initiation of the clock dead band signal in subsequent half cycles of converter operation.

BRIEF DESCRIPTION OF THE DRAWING

The objects and features of the invention will become apparent from a reading of the following description of an illustrative embodiment, taken in conjunction with the drawing, in which:

FIG. 2 is a more detailed schematic of the logic portion of the dynamic dead band circuit; and FIGS. 3A, 3B, and 3C are timing diagrams depicting the relationship of signals appearing at pertinent points in the circuitry shown in FIGS. 1 and 2.

DETAILED DESCRIPTION

Figure 1:
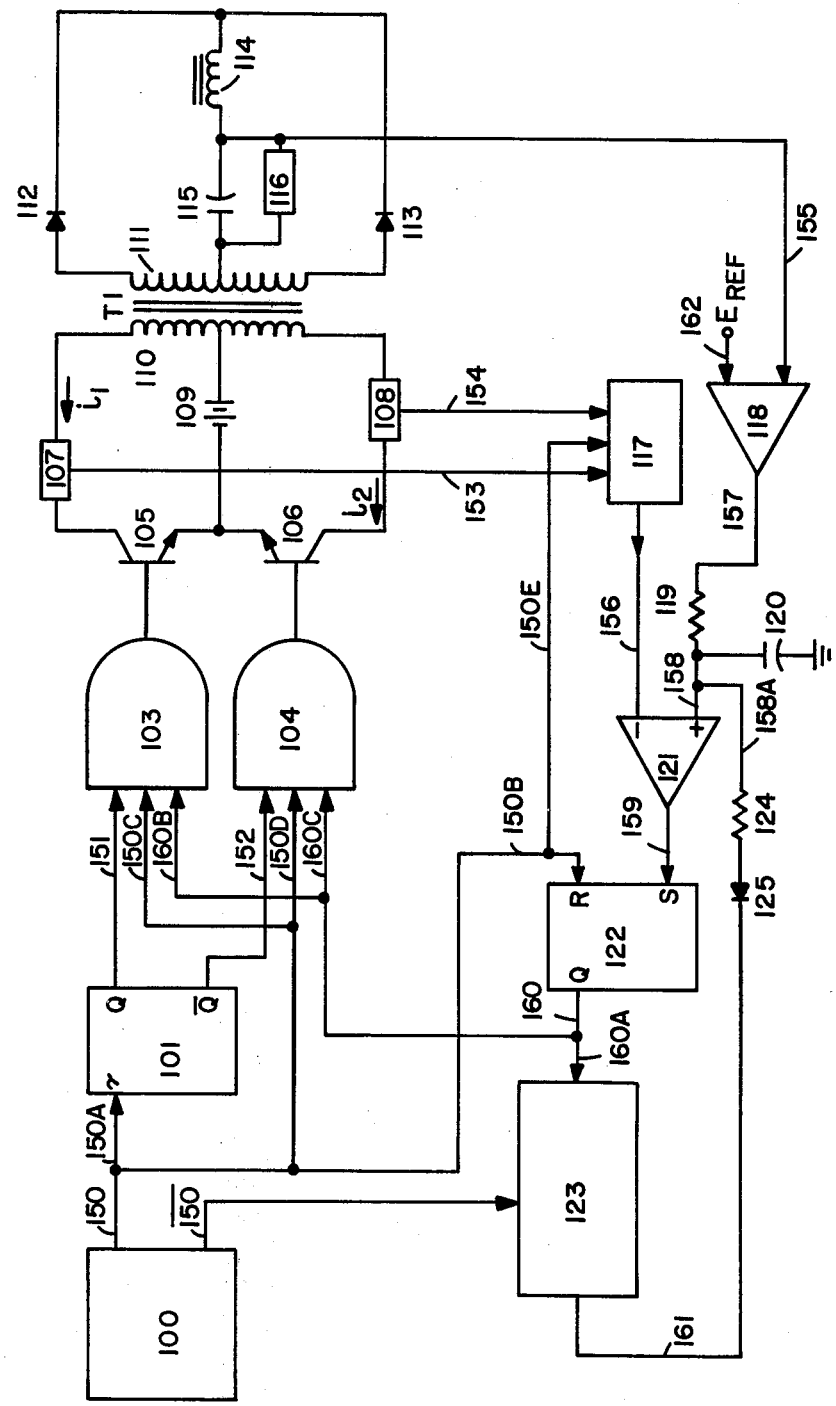
FIG. 1 is a functional schematic of a DC/DC converter incorporating a dynamic dead band circuit designed in accordance with the principles of the invention.

Referring to FIG. 1, a DC-to-DC converter having a push-pull inverter stage with pulse width modulated output regulation and current balance control is shown. The major functional sections of the converter of FIG. 1 are:

the clock circuit 100;

the inverter stage comprising toggle flip-flop 101, AND gates 103 and 104, power switching transistors 105 and 106, transformer T1, primary current monitors 107 and 108, and DC input source 109;

the output circuit of the converter comprising rectifying diodes 112 and 113, filter capacitor 115, filter choke 114, and load 116;

the pulse width modulation means for providing inverter transistor variable turn-off control comprising variable-slope sawtooth waveform generator 117, comparators 118 and 121, resistor 119, capacitor 120, and logic latch circuit 122, which, for the present embodiment, takes the form of a conventional set/reset flip-flop;

the dynamic dead band circuit, shown as functional block 123 in FIG. 1, while its detailed logic design is set forth in FIG. 2.

The converter clock 100 has an output 150 coupled to the toggle, or τ, input of toggle flip-flop 101 via path 150A, to the reset input, R, of latch 122 via path 150B, to a first input of AND gate 103 via path 150C, to a first input of AND gate 104 via path 150D, and to a first input of variable-slope sawtooth waveform generator 117 via path 150E. Output $\overline{150}$, which carries the logical complement of the clock signal appearing at clock output 150, is coupled to dynamic dead band circuit 123.

The Q output of flip-flop 101 is coupled to a second input of AND gate 103 via path 151, while the $\overline{Q}$ output of flip-flop 101 is coupled to a second input of AND gate 104 via path 152. The output of AND gate 103 is coupled to the base of inverter power switching transistor 105, while the output of AND gate 104 is coupled to the base of inverter power switching transistor 106.

The emitters of transistors 105 and 106 are commonly tied to the negative terminal of input DC source 109. The collector of transistor 105 is coupled via current monitor 107 to one end of primary winding 110 of transformer T1, while the collector of transistor 106 is coupled via current monitor 108 to a second end of winding 110. The positive terminal of input source 109 is coupled to a center tap of winding 110.

The load 116 being powered by the converter is coupled between a tap off transformer secondary winding 111 and a first terminal of filter choke 114. Filter capacitor 115 is coupled across load 116. The alternating current furnished by the push-pull inverter stage is rectified by diodes 112 and 113, diode 112 coupling a first end of winding 111 to the second terminal of choke 114, and diode 113 coupling the opposite end of winding 111 to the second terminal of choke 114.

The converter voltage presented to load 116 is monitored via path 155 at op amp 118 of the pulse width modulation circuitry. A DC reference potential, $E_{REF}$, is coupled via path 162 to a second input of op amp 118. The push-pull inverter current supplied by transistors 105 and 106 is monitored by current monitors 107 and 108, which are respectively coupled via paths 153 and 154 to second and third inputs of variable-slope sawtooth waveform generator 117. Monitors 107 and 108 could, for example, comprise current transformers.

The output of op amp 118 is coupled via path 157 and resistor 119 to non-inverting input 158 of comparator 121. Capacitor 120 is coupled between input 158 and reference ground potential. The output of sawtooth generator 117 is coupled via path 156 to an inverting input of comparator 121. The output of comparator 121 is coupled via path 159 to the set, or S, input of logic latch 122.

The Q output of latch 122 is coupled to an input of dynamic dead band circuit 123. The output 161 of dynamic dead band circuit 123 is coupled via diode 125 and resistor 124 to the non-inverting input of comparator 121.

To best understand the novel features of the dynamic dead band circuit, the operation of the converter of FIG. 1 will first be described disregarding the presence or effect of dynamic dead band circuit 123. Such description of operation of the circuitry of FIG. 1 is best set out with supplementary reference to the timing diagram of FIG. 3A. Reference numerals in FIG. 3A are identical to the reference numerals used at corresponding pertinent points in the functional schematic of FIG. 1.

As seen from FIG. 3A, output 150 goes low for a predetermined dead band interval at the start of each half cycle of converter operation. The low-going pulse functions to:

(1) reset the output level of sawtooth generator 117, whose output at path 156 is shown in FIG. 3A, (2) inhibit both AND gates 103 and 104 via paths 150C and 150D to ensure the nonconductive state at both power switching transistors 105 and 106, and (3) toggle the output of flip-flop 101 to prime either AND gate 103 or 104 in preparation for the next half cycle of inverter current flow, as depicted by $i_1$ and $i_2$ of FIGS. 1 and 3A. When output 150 of clock 100 goes high, the voltage at path 156, which is the output of generator 117, begins to rise. When the voltage at 156 exceeds the reference voltage at 158, which is the non-inverting input level of comparator 121, output 159 of comparator 121 goes low allowing the reset of latch 122 by the positive logic level appearing at the reset input of latch 122 via path 150B. Reset of latch 122 results in a low-going signal at the latch 122 Q output, thereby disabling AND gates 103 and 104 via paths 160B and 160C. In FIG. 3A, the point at which the sawtooth waveform at 156 exceeds the reference level is indicated by the dashed line reference to $E_{158}$. The reference voltage across capacitor 120 of FIG. 1 is developed, for this particular embodiment, by comparing a preselected DC reference level, $E_{REF}$, with the actual load voltage at op amp 118.

If either inverter half-cycle current, $i_1$ or $i_2$, goes out of balance, the effect is electronically compensated for by means of variable-slope sawtooth waveform generator 117. Assume, for example, that collector current $i_1$ of transistor 105 becomes greater during its respective half cycle of converter operation than collector current $i_2$ of transistor 106. This condition is made known to generator 117 via current monitors 107 and 108. Under this condition, generator 117 will produce a sawtooth output at 156 having greater positive slope for the transistor 105 conduction half cycle than for the transistor 106 conduction half cycle, thereby terminating current flow through transistor 105 at an earlier time than for transistor 106. In this way, the current imbalance is compensated to maintain transformer core T1 flux balance.

The implementation of a variable slope generator such as 117 of FIG. 1 is taught in the previously-referenced U.S. Pat. No. 4,002,963—Hunter, and further detail not critical to the principles of the instant invention will not be set forth in this specification.

It will be apparent to those skilled in the art that, to this point of the description, the operation of a prior art push-pull, pulse-width-modulated converter with electronic current balance has been set forth. While such a prior art current balance arrangement using a variable slope sawtooth generator improves performance and reliability of the converter, the current balance arrangement, absent incorporation of the instant invention, will not function under conditions that force the error reference voltage at point 158 of FIG. 1 to reach a level so high that the dead band interval of clock 100 terminates inverter transistor conduction, rather than a low-going signal at output 159 of comparator 121. Such a high value of $E_{158}$ occurs, for example, when the converter input voltage, 109, is below its low-line value, when sudden increases in output loading occur, or when the converter is turned-off.

The dynamic dead band circuit 128 of FIG. 1 is added to the prior art converter arrangement to ensure the continued functioning of the electronic current balance circuitry of the prior art even under the above abnormal converter operating conditions. A logic design of such a dynamic dead band circuit is set forth in FIG. 2 and will be described in conjunction with the timing diagrams in FIGS. 3B and 3C.

Referring first to FIG. 2, inputs 160A and $\overline{150}$ to dynamic dead band circuit 123 are coupled to a logic latch comprising NAND gates 201 and 202. Input $\overline{150}$ is coupled to a first input of NAND gate 202, while input 160A is coupled to a first input of NAND gate 201. The output of NAND gate 201 is coupled to a second input of NAND gate 202, and the output of NAND gate 202 is coupled to a second input of NAND gate 201.

The output of the logic latch at 250 is coupled, via resistor 204—capacitor 205 time delay network, to a logic decision circuit comprising NAND gates 203 and 204. Output 250 of NAND gate 201 is coupled via resistor 204 to an input of NAND gate 203. Capacitor 205 is coupled between the input of gate 203 and reference ground potential. The output 251 of NAND gate 203 is coupled to a first input of NAND gate 204. Dynamic dead band circuit input $\overline{150}$ is coupled to a second input of NAND gate 204. Output 161 of NAND gate 204 is coupled to the pulse width modulation circuitry at point 158 of FIG. 1 via isolation diode 125 and current limiting resistor 124, each also shown in FIG. 1.

FIG. 3B gives a timing diagram for two consecutive half cycles of converter operation under one mode of operation of the dynamic dead band circuit wherein the converter output experiences a large sudden increase in load current while the converter input voltage is near the rated low-line value. Prior to the first inverted dead band pulse at $\overline{150}$, shown in FIG. 3B, the output of comparator 121 of FIG. 1 has gone low resulting in the low-going pulse at logic latch 122 output 160A. Hence, no dynamic dead band circuit output at path 161 is generated. However, in the next half cycle of operation, assume reference voltage $E_{158}$ across capacitor 120 of FIG. 1 goes high enough to prevent a low-going signal at 160A prior to the next dead band inverted pulse at $\overline{150}$. Under this condition, a low-going pulse will be generated at output 161 for the full duration of the dead band pulse interval. Such a negative-going voltage excursion at 161 is coupled via diode 125 and resistor 124 to point 158 of FIG. 1, resulting in a decrease in the reference voltage across capacitor 120 for presentation to comparator 121 of the pulse width modulation circuitry. Hence, in subsequent cycles of converter operation, comparator 121 will function to terminate inverter current pulses, rather than termination via the disabling signal 150 from clock 100 during the dead band interval. Depending on the nature of the loading of the converter output, several cycles of negative pulses at path 161 may be required to sufficiently decrease the reference voltage across capacitor 120 of FIG. 1 such that the current balance circuitry will be effective to terminate inverter current flow.

Summarizing to this point, the function of dynamic dead band circuit 123 is to detect when conduction of the inverter power transistors is not being terminated by comparator 121 of FIG. 1. If such a condition arises, error reference signal $E_{158}$ at capacitor 120 is pulled lower so that inverter current conduction will be once again terminated by comparator 121 in subsequent cycles of converter operation.

Under a different mode of dynamic dead band circuit operation, the time delay network comprising resistor 204 and capacitor 205 affects circuit operation. This second mode of operation occurs, for example, when no sudden converter load surges are encountered, but where the converter input voltage is just at or below its low-line rating. Such a condition results in timing waveforms such as those depicted in FIG. 3C.

Without the time delay network in the dynamic dead band circuit of FIG. 2, the basic principle of the invention would still be realized. However, the circuit would have a tendency to produce long pulses at 161, as shown in FIG. 3B, for several cycles and then no 161 pulses until a load surge reoccurred at the inverter output. Such non-gradual changes from no pulses whatsoever at point 161 to full dead band interval pulses is not dangerous or inherently inoperative, but the ability of the converter power circuit to deliver full rated output at low-line input is somewhat reduced without a time delay network being incorporated into the dynamic dead band circuit of FIG. 2.

Hence, the time delay network comprising resistor 204 and capacitor 205 of FIG. 2 is added to alleviate the problem of non-gradual transitions of corrective negative pulses being applied by output 161 to capacitor 120 of FIG. 1. By introducing a time delay, $\Delta t$ shown in FIG. 3C, between points 250 and 251 of FIG. 2, the control signals passed via path 161 to the pulse width modulation circuitry will have pulse widths varying in subsequent operation cycles with a smooth transitional nature. Such operation permits the converter of FIG. 1 to deliver rated output power at a slightly lower value of input voltage than would otherwise be possible.

With the time delay network operative, it is seen that the dynamic dead band circuit will deliver a negative-going corrective control signal pulse at output 161 whenever the inverter current continues within a predetermined forbidden time zone adjacent to the initiation time point of the clock dead band interval, defined by the positive-going pulses at path $\overline{150}$. This forbidden time zone, $\Delta t$, is determined by the values of resistor 204 and capacitor 205 of FIG. 2. Thus, the longer the time period, $t_1$, that comparator 121 of FIG. 1 functions to terminate inverter current prior to initiation of dead band pulse $\overline{150}$, the shorter the time interval, $t_2$, for the control pulse produced at output 161.

It should be noted, in conjunction with the embodiment of the dynamic dead band circuit of FIG. 2, that a logic race problem can occur if the clock signal at path $\overline{150}$ lags its complementary clock signal at path 150 of FIG. 1. Various methods for preventing this phase lag, well-known in the art, can be applied to the circuitry involved. For example, a compensating delay element, such as a capacitance to ground, could be added at input 160A of FIG. 2. Alternatively, clock 100 of FIG. 1 could be internally designed to ensure that output $\overline{150}$ never phase lags output 150.

The incorporation of the invention into a conventional push-pull converter interferes somewhat with the feedback error control voltage, $E_{158}$ of FIGS. 1 and 3A, thereby decreasing slightly the available inverter current pulse width for each half cycle of operation. However, any deleterious effect of this interference is more than offset by the resultant inverter transformer magnetizing current limitation achieved by use of the instant inventive principles. Additionally, close matching of the electrical characteristics of the inverter power switching transistors is no longer necessary with the incorporation of the invention as described hereinabove.

The invention has been illustrated with reference to a particular embodiment. It is to be understood that many details used to facilitate the description of such a particular embodiment were chosen for convenience only and without limitation on the scope and spirit of the invention. Many other embodiments may be devised by those skilled in the art without departing from the invention as claimed as described herein.

What is claimed is:

1. In a converter circuit including a push-pull inverter having two alternatively conducting power switching devices, a clock coupled to the inverter, operative to define at its output each half cycle of converter operation, each half cycle including a dead band interval during which both inverter power switching devices are forced to a nonconducting state, and pulse width modulation means coupled to the inverter and to the clock, operative to terminate each half cycule of inverter current flow at any time prior to initiation of a dead band interval, the improvement comprising;

dynamic dead band means having first and second inputs respectively coupled to the clock and to the pulse width modulation means, and an output coupled to the pulse width modulation means, the dynamic dead band means including logic means operative to provide a control signal at the dynamic dead band means output whenever the conduction state of an inverter power switching device is terminated by the dead band interval of the clock, the control signal being of sufficient magnitude, duration, and polarity to enable the pulse width modulation means to effect termination of inverter power switching device conduction states prior to initiation of the clock dead band interval in subsequent half cycles of converter operation.

2. The improvement as set forth in claim 1 wherein the logic means comprises;

a logic latch circuit having first and second inputs respectively coupled to the first and second inputs of the dynamic dead band means, the logic latch circuit operative to indicate, by a logic signal of a predetermined polarity at its output, whether a logic signal indicative of cessation of inverter current in a given half cycle of operation has occurred prior to initiation of the clock dead band interval, logic decision means having first and second inputs respectively coupled to the logic latch circuit output and to the first input of the dynamic dead band means, operative to produce at its output the control signal for use by the pulse width modulation means whenever the logic signal appearing at the first dynamic dead band means input is not substantially equal to the logic signal of the predetermined polarity at the output of the logic latch circuit, and means for coupling the logic decision means output to the dynamic dead band means output.

3. The improvement as set forth in claim 2 wherein the means for coupling the logic decision means output to the dynamic dead band means output comprises;

a diode in series connection with a current limiting resistor, the diode being poled such that the dynamic dead band means output is activated only by the presence of the control signal generated by the logic means.

4. In a converter circuit including a push-pull inverter having two alternatively conducting power switching devices, a clock coupled to the inverter, operative to define at its output each half cycle of converter operation, each half cycle including a dead band interval during which both inverter power switching devices are forced to a nonconducting state, and pulse width modulation means coupled to the inverter and to the clock, operative to terminate each half cycle of inverter current flow at any time prior to initiation of a dead band interval, the improvement comprising;

dynamic dead band means having first and second inputs respectively coupled to the clock and to the pusle width modulation means, and an output coupled to the pulse width modulation means, the dynamic dead band means including logic means operative to provide a control signal at the dynamic dead band means output whenever the conduction state of an inverter power switching device is not terminated by the pulse width modulation means before a predetermined point in time prior to intiation of any clock dead band interval, the control signal being of sufficient magnitude, duration, and polarity to enable the pulse width modulation means to effect termination of inverter current flow before the predetermined point in time in subsequent half cycles of converter operation.

5. The improvement as set forth in Claim 4 wherein the logic control means comprises;

first and second logical NAND gates each having first and second inputs and an output, the first input of the first NAND gate coupled to the first input of the dynamic dead band means, the first input of the second NAND gate coupled to the second input of the dynamic dead band menas, the output of the first NAND gate coupled to the second input of the second NAND gate, the output of the second NAND gate coupled to the second input of the first NAND gate, a time delay network, a third NAND gate having an input and an output, the time delay network coupled between the output of the second NAND gate and the input of the third NAND gate, a fourth NAND gate having first and second inputs and an output, the first input of the fourth NAND gate coupled to the output of the third NAND gate, the second input of the fourth NAND gate coupled to the first input of the dynamic dead band means, and means for coupling the output of the fourth NAND gate to the output of the dynamic dead band means.

6. The improvement as set forth in claim 5 wherein the time delay network comprises;

resistance means coupled between the output of the second NAND gate and the input of the third NAND gate, and capacitance means coupled between the input of the third NAND gate and a reference potential source, the predetermined point in time prior to initiation of any clock dead band interval being chosen according to the values of the resistance means and the capacitance means.

7. The improvement as set forth in claim 5 wherein the means for coupling the output of the fourth NAND gate to the output of the dynamic dead band means comprises;

a diode and a current limiting resistor, the diode having its cathode terminal coupled to the output of the fourth NAND gate and its anode terminal coupled via the current limiting resistor to the output of the dynamic dead band means.

* * * * *